March 7, 1939.　　　C. H. BEATTIE, JR　　　2,149,716
ORIENTATION APPARATUS
Filed June 7, 1937　　　3 Sheets-Sheet 1

WITNESS:

INVENTOR
Clay H. Beattie, Jr.
BY
ATTORNEYS.

March 7, 1939. C. H. BEATTIE, JR 2,149,716
ORIENTATION APPARATUS
Filed June 7, 1937 3 Sheets-Sheet 2

WITNESS:
Rob R Mitchel

INVENTOR
Clay H. Beattie, Jr.
BY
Busser, Harding

March 7, 1939.  C. H. BEATTIE, JR  2,149,716
ORIENTATION APPARATUS
Filed June 7, 1937  3 Sheets-Sheet 3

WITNESS:
Rob R Kitchel

INVENTOR
Clay H. Beattie, Jr.
BY
ATTORNEYS.

Patented Mar. 7, 1939

2,149,716

UNITED STATES PATENT OFFICE

2,149,716

ORIENTATION APPARATUS

Clay H. Beattie, Jr., Covina, Calif., assignor to Sperry-Sun Well Surveying Company, Philadelphia, Pa., a corporation of Delaware Application June 7, 1937, Serial No. 146,742

6 Claims. (Cl. 33—1)

This invention relates to an apparatus for determining the dip and strike of strata appearing in cores taken from a bore hole from data including the magnetic polarity or susceptibility of a core, the inclination and direction of the bore hole at the point where the core was taken, and other auxiliary information.

As described, for example, in Herrick Patent 1,792,639, dated February 17, 1931, it is possible to determine to a fair degree of accuracy the dip and strike of strata penetrated by a bore hole if measurements are made to ascertain the magnetic polarization of a core taken at the location of the strata.

The assumption, borne out by observations, is that in a magnetically polarized core, the axis of polarization originally coincided in direction and sense with the earth's field, and that in a core showing an axis of maximum susceptibility, that axis coincided in direction with the direction of the earth's field, though in the latter case the susceptibility axis is without sign.

In making such determinations, the magnetic polarity or axis of maximum susceptibility of the core is determined by means of an apparatus such as that disclosed in said Herrick patent, and the magnetic north or susceptibility axis of the core indicated thereon. By suitable measurements there can then be determined the apparent dip and strike of a bedding plane appearing in the core with respect to the magnetic north or susceptibility axis so indicated.

For simplicity of expression, the magnetic polarity, alone, will be usually referred to hereafter, though it will be understood that the axis of maximum susceptibility may be used instead of the axis of polarization, with the exception that the latter will give rise to two alternative results from which the true one must be chosen by reference to other information.

Obviously, however, the dips and strikes thus obtained are not the true ones and various other factors must be considered before there can be ascertained the actual value of the dips and strikes with respect to the true north. First there must be considered the direction of the bore hole, both in inclination and azimuth, and there must be further considered the magnetic dip of the earth's field at the location where the core was taken. It will be obvious from a casual consideration of the corrections necessary to the apparent dip and strike to secure the true dip and strike that the problem is mathematically complicated and that calculations would be quite subject to inadvertent errors due to mistakes in sign in taking into account the various corrections.

It is accordingly the object of the present invention to provide an apparatus on which the various data may be set up and which, after adjustments in accordance with the various data, will give a true indication of the dip and strike of the bedding plane shown in a magnetically anisotropic core, in which the magnetic anisotropy may take the form of polarization or anisotropic susceptibility. Various proposals have been made heretofore for such apparatus, but the proposals involved complications in the matter of setting up the data on the apparatus and interpreting the final result. The apparatus forming the subject-matter of the present invention, however, is simple in both form and manipulation, and is adapted for the rapid and accurate determination of the results indicated above.

The above general object and more specific objects of the invention, particularly relating to details, will be apparent from the following description read in conjunction with the accompanying drawings, in which.

Figure 2:
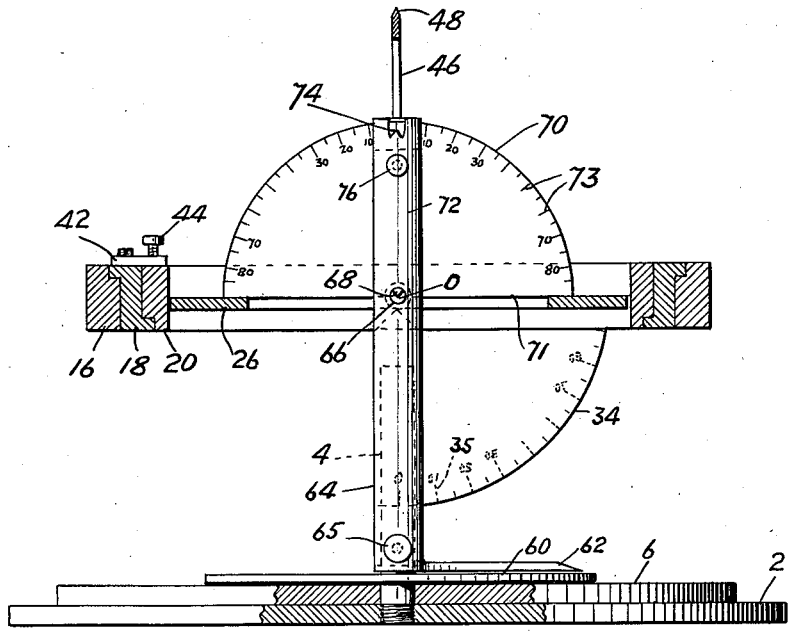
Figure 2 is a vertical section, taken at right angles to the section of Figure 1.

The apparatus in its preferred form, indicated in the drawings, comprises a base 2 supporting an upright post 4 on which there is arranged to rotate a plate 6, the position of which relative to the base 2 is indicated by a suitable scale and marker, indicated at 3 and 5, respectively. The plate 6, which may be clamped in adjusted position by a screw 7, carries uprights 8 and 10 provided with opposing trunnions 12 and 14 having a common axis the intersection of which, with the vertical axis of post 4, defines the point 0 which is the common center of construction and movement of various parts of the device hereafter described.

A gimbal ring 16, concentric with point 0, is mounted on the trunnions 12 and 14. This ring is provided with an inner step, as indicated, for the support of an intermediate ring 18, which is adapted to be freely rotated within the ring 16 about their common axis. The intermediate ring 18 is in turn provided with an inner step for the support of an inner ring 20, which also has the same axis as rings 16 and 18 and is adapted to be rotated inside the ring 18 about such axis.

The inner ring 20 supports the pivot pins 22 and 24 of an inner gimbal ring 26. The pins 22 and 24 are secured in the gimbal ring by set screws 28 and 30. The gimbal ring 26 may be held against pivotal movement within the ring 20 by means of a clamping screw 32.

The outer ring 16 carries a protractor segment 34 provided with a scale 35 adjacent its edge. This protractor segment 34 may be clamped against a bracket 38 secured to the post 8 by means of a clamping screw 36 so as to hold the ring 16 against pivotal movement about the trunnions 12 and 14. The scale 35 may be viewed through an opening 40 provided with a suitable indicator.

Figure 3:
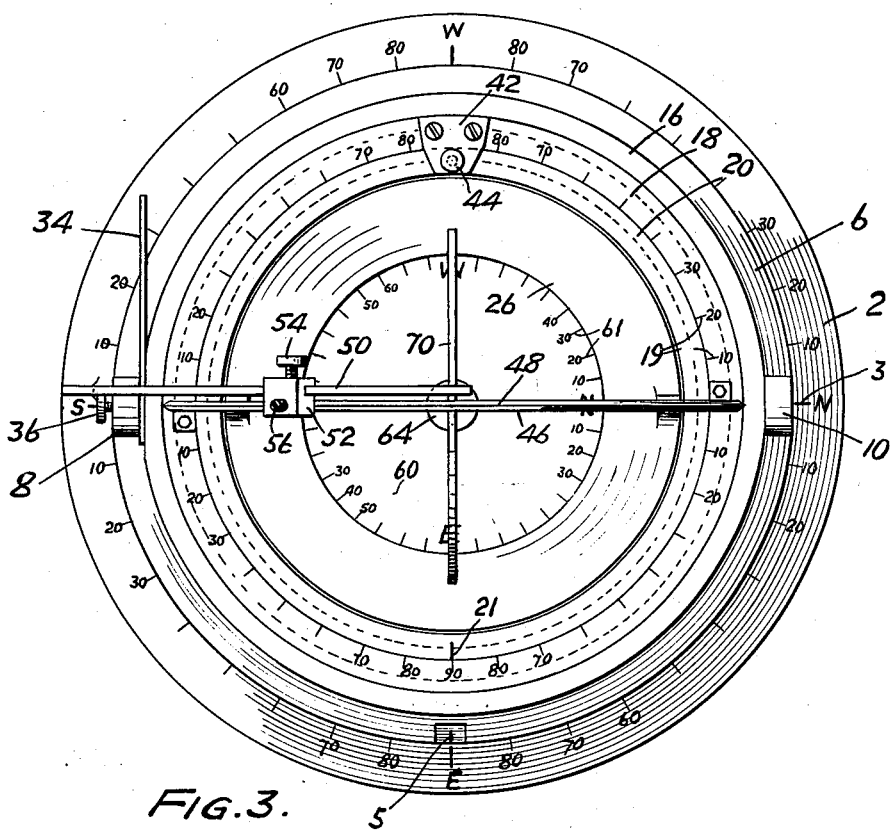
Figure 3 is a plan view of the apparatus with certain parts broken away for the sake of clearness.
Figure 4:
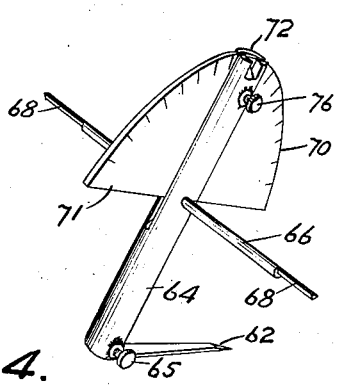
Figure 4 is a perspective view showing the construction of a protractor element.

The ring 20 may be clamped against rotation relative to the ring 18 by the provision of the elements indicated in Figures 2 and 3, comprising a plate 42 secured to the ring 18 and overlying the ring 20. This plate is provided with a clamping screw 44 serving to clamp the ring 20 against the supporting step of the ring 18.

The intermediate ring 18 carries a semicircular member 46 having a sharp outer edge, indicated at 48, which has as its center the point 0 and lies in a plane perpendicular to the plane of the ring 18. An arc 50 forms the upper portion of a bracket supported by the base 2 and has sliding on it a rider 52 arranged to be clamped in adjusted position by a clamping screw 54 and provided with a pointed screw 56. The point of the screw 56 is designed to move in a circular arc having the point 0 as its center and in a plane perpendicular to the base 2. The angle between the horizontal and the center line of the screw 56, which passes through the point 0, is indicated by a point 58 on the carrier read against scale markings 51 carried on the member 50.

Figure 1:
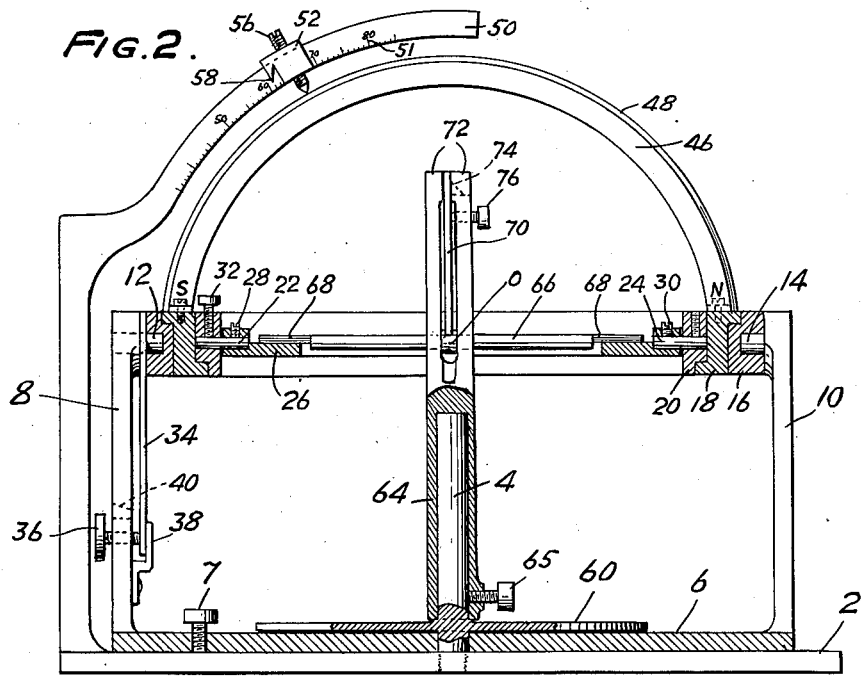
Figure 1 is a vertical section showing the various mechanical elements constituting the improved apparatus.

The relative arrangements of the parts so far described may be understood as follows: The upper surface of the base 2 represents a horizontal plane at the position of the earth where a core was taken. More strictly speaking, a horizontal plane is vectorially represented by the axis of post 4, since a plane, in vectorial analysis, is completely represented by specification of a vector perpendicular to it. The arcuate path of movement of the point of screw 56 defines a vertical plane which will intersect the base 2 in a line representative of a horizontal north-south line at this location, north being to the right, as indicated in Figure 1. The direction of the axis of screw 56 is the direction of the magnetic vector at that location. In the portions of the northern hemisphere of interest in boring, this magnetic vector is such that the north seeking end of a balanced magnet needle will dip downwards toward the north.

The trunnions 12 and 14 have an axis parallel to the horizontal surface of the base 2. The ring 20 may be turned so as to bring the axis of the pivot pins 22 and 24 into coincidence with this axis, as shown in Figure 1. When in such position, the upper surface of the ring 26 contains this same axis, as also shown in Figure 1. Not only at this time, but at all times, the axis of the pins 22 and 24 and the plane of the upper surface of the ring 26 pass through the point 0. The three rings 16, 18 and 20 are preferably provided with upper plane surfaces which will lie in a common plane always parallel to their geometrical plane, which may be said to be a plane through 0 perpendicular to their common axis. This common plane will be horizontal when the gimbal ring 16 is in the position measured as zero on the scale 35. Under such conditions, the edge 48 of the arc 46 will lie in a vertical plane, and may in its initial position be regarded as lying in the plane of movement of the point of the screw 52, as shown in Figure 1. In such case, it will, of course, lie in the representation of a vertical magnetic north-south plane.

Before proceeding with the discussion of the mode of operation of the device, there may be described an auxiliary measuring means provided for convenience, though it should be stressed that this measuring means is quite independent, during the major part of the use of the instrument, of the other devices which have been described.

The last named device comprises a sleeve member 64 provided with an inner bore rotatably fitting the post 4 and provided with a pointer 62 cooperating with a scale 61 on a stationary plate 60, which may be formed as part of the post 4 above the plate 6. The sleeve member 64 may be secured in adjusted position on the post 4 by means of a screw 65.

Extending at right angles to the axis of the sleeve 64 (which is that of the post 4) is a rod 66 having at its outer end knife edges 68, which edges lie in a line horizontal with respect to the base 2 and passing through the point 0 when in contact with the upper surface of the gimbal ring 26 when that surface is horizontal or, as pointed out hereafter, may lie on a horizontal line drawn on that surface at any time. Mounted on the pin 66 for angular movement about the line defined by its knife edges is a protractor member 70 which is provided with a lower edge 71 arranged at a right angle to the line defined by the knife edges 68. This protractor 70 carries a scale 73 readable through an indicating opening 74 in one of the bifurcations 72 of the upper end of the sleeve 64, between which bifurcations the protractor is located. The protractor may be locked in fixed position by means of a thumb screw 76.

The apparatus is used for the determination of the dip and strike of strata penetrated by a core in which the strata appears. The apparatus gives the strike with reference to the magnetic north, from which the strike referred to the geographical north may, of course, be determined from the known magnetic declination.

The data from which the above is determined include the following:

(a) The inclination of the bore hole from which the core was taken.

(b) The azimuth of the inclination of the bore hole.

(c) The component of the magnetic polarization vector (or the axis of maximum susceptibility) of the core perpendicular to the axis of the core.

(d) The strike of the bedding plane shown in the core relative to (c).

(e) The dip of the bedding plane shown in the core with respect to the axis of the core.

(f) The magnetic dip at the location of the bore hole.

The above constants may be set up in the apparatus as follows:

Starting from a zero position, such as that indicated in Figures 1, 2 and 3, with the knife edges 68 aligned with the axis of the pivot pins 22 and 24 (which axis is preferably marked on the ring 26), the clamping screw 32 is released and the protractor 70 tilted until its edge 71 and the ring 26 assume a dip as measured by the scale 73 equal to the dip of the bedding plane with respect to the axis of the core. The ring 26 is then clamped in this position by manipulation of the screw 32.

At this point the elements carried by the sleeve 64 may be taken out of operation until the time of final measurement. This may be conveniently effected by raising the sleeve 64 and clamping it in such raised position by the screw 65. The protractor may also be moved to an out of the way position, which will normally be its horizontal position in which it may be clamped by the thumb screw 76. The knife edges 68 are thereby raised away from plate 26. If during some subsequent adjustment engagement with these knife edges or with the protractor is likely to take place, then it is only necessary to rotate it out of the way. For the further adjustments, therefore, the sleeve 64 and its associated parts may be wholly disregarded.

Regarding the circle defined by the edge 48 of the arc 46 as defining a plane in which the polarization vector (or axis of maximum susceptibility) of the core must lie, which means that the intersection of this plane with the plane upper surface of the ring 20 will define a line indicating the component of the polarization perpendicular to the axis of the core, which axis will be that of the ring 20, the ring 20 will now be rotated within the ring 18 to bring the axis of the pins 22 and 24 into such relation with respect to the plane indicated by the arc 48 as to correspond with the relation of the strike of this plane in the core to the component of the polarization of the core perpendicular to the core axis. The ring 20 is fixed in such position to ring 18 by producing a clamping action of the thumb screw 44.

It will now be seen that, regarding the axis of the rings 18 and 20 as the axis of the core, there will have been reproduced in the apparatus the dip and strike of a bedding plane shown in the core with respect to the polarization vector of the core, which, it will be noted, will lie in the plane of the arc 48. It should be noted that the apparatus such as that shown in the Herrick patent referred to above does not determine this vector, but only its component perpendicular to the axis of the core. This component of the polarization vector will be represented in the apparatus by the intersection of the plane of the arc 48 with the plane of the upper surfaces of the rings 18 and 20, which latter plane is, of course, parallel to a plane containing the strike line of the gimbal ring 26, namely, the center line of the pins 22 and 24, and perpendicular to the axis of rings 16, 18 and 20.

Following such adjustment the gimbal ring 16 may be tilted on its trunnions 12 and 14 at an angle such that the inclination of its axis to the vertical will represent the inclination of the bore hole with respect to the vertical. Such tilting is effected by freeing the thumb screw 36 and moving the ring until the scale of the protractor 34 indicates the desired inclination, whereupon it is clamped. The plate 6 is now rotated about the post 4 and clamped in position by the screw 7 to correspond with the azimuthal direction of the inclination of the bore hole. In other words, the axis of the ring 16 will now represent the axis of the bore hole in both azimuth and inclination with respect to the north-south marking on the plate 2, which marking will lie in the vertical plane defined by the movement of the point of the screw 56.

The rider 52 is now adjusted on the member 50 to bring the axis of the screw 56 into a position corresponding to the magnetic dip at the location of the bore hole.

So far, it will be noted, the only element that has not been taken into account is the coincidence of the magnetic vector of the earth represented by the axis of the screw 56 and the magnetic polarization vector of the core which is known to lie in the plane of the arc 48. The apparatus still has one degree of freedom involving the rotation of the ring 18 within the ring 16. Such rotation is now effected until the sharp edge 48 is brought into coincidence with the end of the screw 56. This, it will be noted, is always possible since such rotation will cause the arc 48 to sweep out a hemisphere adjacent which the point of the screw 56 is always located. The axial adjustment of the screw 56 is merely to permit it to be brought very close to the edge 48 for accurate reading.

Figure 6:
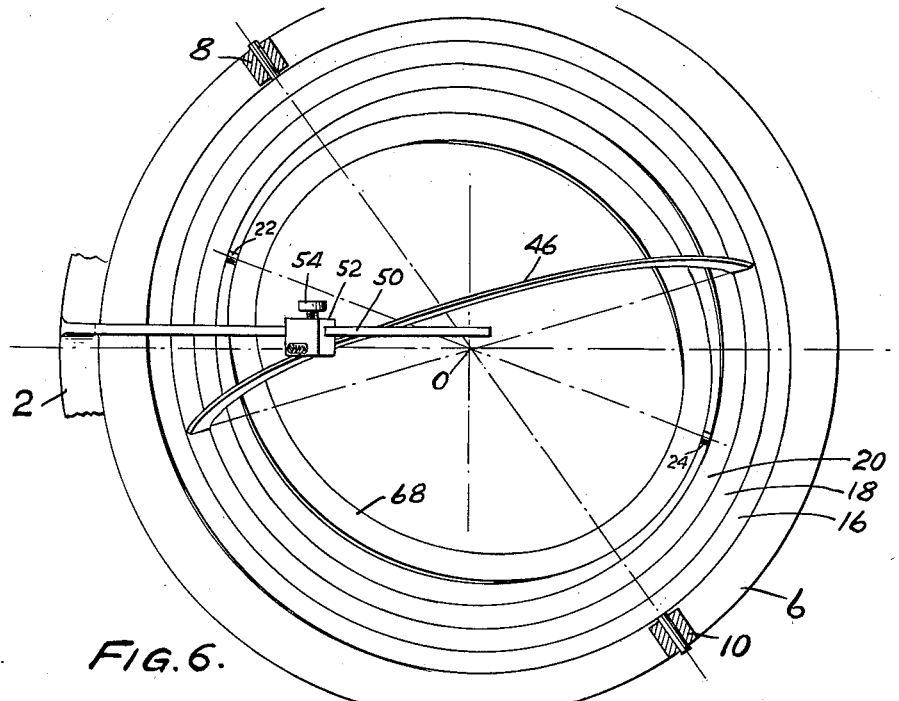
Figures 5 and 6 are diagrammatic elevation and plan views, respectively, illustrating the mode of use of the apparatus.
Figure 5:
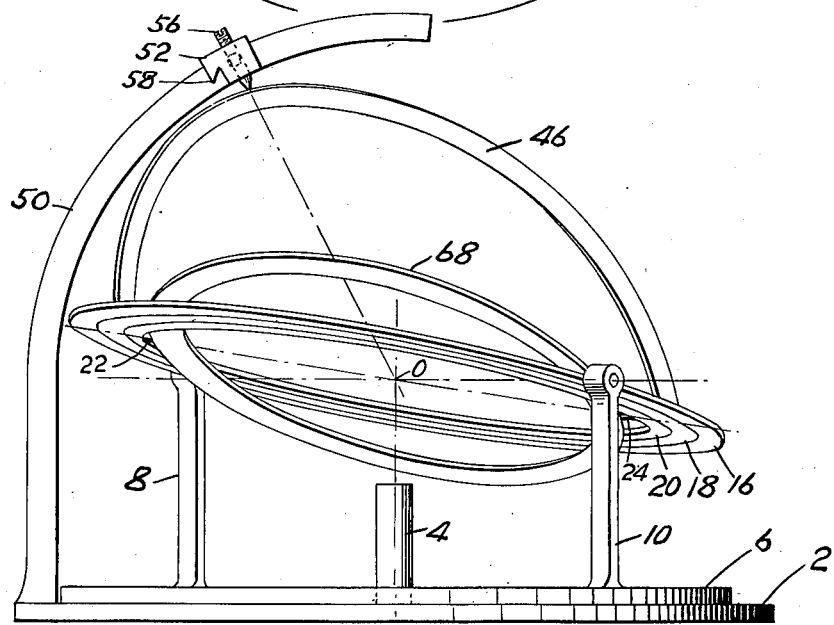

By the above adjustments a completely consistent system has been set up corresponding to the system which would exist before the core was taken from the bore hole. Figures 5 and 6 represent diagrammatically the position of the various parts as they may be assumed during a typical set of adjustments. It will be noted from these figures that inclination of the bore hole may serve to throw the ring 46 quite substantially out of a vertical north-south plane.

The plane of the upper surface of the gimbal ring 26 will now, in its relationship to the base 2, represent the bedding plane which appeared in the core in its relationship to the earth. It remains, therefore, only to measure the dip and strike of the plane of the gimbal ring 26 with respect to the base 2. To do this, the sleeve 64 and its associated parts may be again brought into action. The screws 65 and 76 are released and the sleeve 64 rotated to bring the knife edges 68 (which must always be horizontal) into engagement with the upper surface of the ring 26. Such engagement can only occur when the knife edges coincide with the strike line of the surface of ring 26, and at the same time the protractor must be inclined and also engaging the ring 26 so that there can be read off directly from the scale 73 the dip of the ring 26. The pointer 62 may be read against the scale 61 giving the direction of slope of the bedding plane with respect to the magnetic north.

While polarization has been referred to specifically, and anisotropic susceptibility only parenthetically, it will be understood that the manipulation of the apparatus for the latter property of a core is identical with that described except for the indefiniteness of sign. Such indefiniteness requires only the solution for the two alternatives and choice of solution depending on other factors, for example, a known tendency towards slope in a certain direction, correlations with other cores, or the like.

It will be seen from the above that there may be set up on the apparatus all of the data necessary to ascertain the position of the bedding plane in a core and that the result may be read directly without any computation. Thus there are avoided the complications of spherical trigonometrical calculations and the possible errors therein.

It will be clear that many equivalent variations of the specific apparatus shown may be made within the scope of the claims.

What I claim and desire to protect by Letters Patent is:

1. Apparatus for the determination of the dip and strike of a bedding plane indicated in a magnetically anisotropic core taken from a bore hole, said apparatus comprising means providing an axis vectorially representing a horizontal plane at the position where the core was taken, a member mounted to rotate about said axis, and a plurality of gimbals mounted on said member, one of the gimbals being mounted on an axis perpendicular to, and intersecting, the first named axis, and another gimbal being mounted on the first gimbal on an axis which intersects the point of intersection of the first two axes, said first and second mentioned gimbals defining, respectively, the axis of a bore hole and the bedding plane indicated in a core therefrom.

2. Apparatus for the determination of the dip and strike of a bedding plane indicated in a magnetically anisotropic core taken from a bore hole, said apparatus comprising means providing an axis vectorially representing a horizontal plane at the position where the core was taken, a member mounted to rotate about said axis, and a plurality of gimbals mounted on said member, one of the gimbals being mounted on an axis perpendicular to, and intersecting, the first named axis, and another gimbal being mounted on the first gimbal on an axis which intersects the point of intersection of the first two axes, said first and second mentioned gimbals defining, respectively, the axis of a bore hole and the bedding plane indicated in a core therefrom, and a protractor device arranged for the measurement of the inclination of the second mentioned gimbal relative to said horizontal plane irrespective of the position of the first mentioned gimbal.

3. Apparatus for the determination of the dip and strike of a bedding plane indicated in a magnetically anisotropic core taken from a bore hole, said apparatus comprising means providing an axis vectorially representing a horizontal plane at the position where the core was taken, a member mounted to rotate about said axis, and a plurality of gimbals mounted on said member, one of the gimbals being mounted on an axis perpendicular to, and intersecting, the first named axis, and another gimbal being mounted on the first gimbal on an axis which intersects the point of intersection of the first two axes, said first and second mentioned gimbals defining, respectively, the axis of a bore hole and the bedding plane indicated in a core therefrom, and a protractor device arranged for the measurement of the inclination and direction of the second mentioned gimbal relative to said horizontal plane irrespective of the position of the first mentioned gimbal.

4. Apparatus for the determination of the dip and strike of a bedding plane indicated in a magnetically anisotropic core taken from a bore hole, said apparatus comprising means providing an axis vectorially representing a horizontal plane at the position where the core was taken, a member mounted to rotate about said axis, a gimbal mounted on said member on an axis perpendicular to, and intersecting, the first named axis, a ring carried by the gimbal and rotatably adjustable in a plane containing the second mentioned axis, and another gimbal mounted on said ring on an axis which intersects the points of intersection of the first two axes, said first and second gimbals defining, respectively, the axis of a bore hole and the bedding plane indicated in a core therefrom.

5. Apparatus for the determination of the dip and strike of a bedding plane indicated in a magnetically anisotropic core taken from a bore hole, said apparatus comprising means providing an axis vectorially representing a horizontal plane at the position where the core was taken, means defining the relation at said position of the earth's magnetic vector to said plane, a member mounted to rotate about said axis, a gimbal mounted on said member on an axis perpendicular to, and intersecting, the first named axis, means defining a plane perpendicular to a plane containing the second mentioned axis, a ring carried by the gimbal and rotatably adjustable in said plane containing the second mentioned axis and relative to the plane defined by the last named means, and another gimbal mounted on said ring on an axis which intersects the point of intersection of the first two axes, said first and second gimbals defining, respectively, the axis of a bore hole and the bedding plane indicated in a core therefrom.

6. Apparatus for the determination of the dip and strike of a bedding plane indicated in a magnetically anisotropic core taken from a bore hole, said apparatus comprising means providing an axis vectorially representing a horizontal plane at the position where the core was taken, means defining the relation at said position of the earth's magnetic vector to said plane, a member mounted to rotate about said axis, a gimbal mounted on said member on an axis perpendicular to, and intersecting, the first named axis, a ring adjustably mounted on said gimbal concentrically therewith, means carried by said ring defining a plane perpendicular to a plane containing the second mentioned axis, a second ring carried by the first ring concentric therewith, and rotatably adjustable in said plane containing the second mentioned axis and relative to the plane defined by the last named means, and another gimbal mounted on said second ring on an axis which intersects the point of intersection of the first two axes, said first and second gimbals defining, respectively, the axis of a bore hole and the bedding plane indicated in a core therefrom.

CLAY H. BEATTIE, Jr.